US006248798B1

(12) United States Patent
Slingsby et al.

(10) Patent No.: US 6,248,798 B1
(45) Date of Patent: Jun. 19, 2001

(54) ANION-EXCHANGE RESINS INCLUDING ION-EXCHANGE GROUPS WITH AT LEAST TWO NITROGEN GROUPS, AND METHODS OF MAKING AND USING SAME

(75) Inventors: Rosanne W. Slingsby, Pleasanton; Christopher A. Pohl, Union City; Jacek J. Jagodzinski, Redwood City; Latha P. Narayanan, Milpitas; Michael Weitzhandler, Sunnyvale, all of CA (US)

(73) Assignee: Dionex Corporation, Sunnyvale, CA (US)

( * ) Notice: Subject to any disclaimer, the term of this patent is extended or adjusted under 35 U.S.C. 154(b) by 0 days.

(21) Appl. No.: 09/198,203

(22) Filed: Nov. 23, 1998

Related U.S. Application Data

(62) Division of application No. 08/609,642, filed on Mar. 1, 1996, now abandoned.
(51) Int. Cl.[7] .................................................. B01J 47/02
(52) U.S. Cl. ........................... 521/28; 210/661; 210/679; 210/692; 521/25; 521/32; 528/482
(58) Field of Search ................................. 521/28, 32, 25; 528/482; 210/661, 679, 692

(56) References Cited

U.S. PATENT DOCUMENTS

| | | | | |
|---|---|---|---|---|
| 4,101,460 | * | 7/1978 | Small | 521/28 |
| 4,191,814 | * | 3/1980 | Amick | 521/32 |
| 4,252,644 | * | 2/1981 | Small | 210/656 |
| 4,351,909 | * | 9/1982 | Stevens | 521/28 |
| 4,373,031 | | 2/1983 | Waite | 521/32 |
| 4,383,047 | * | 5/1983 | Stevens | 521/28 |
| 4,927,539 | | 5/1990 | Stevens et al. | 210/635 |
| 5,066,784 | * | 11/1991 | Sherrington | 530/334 |
| 5,204,376 | | 4/1993 | Henmi et al. | 521/32 |
| 5,324,752 | | 6/1994 | Barretto et al. | 521/28 |
| 5,670,550 | * | 9/1997 | Jarvinen | 521/32 |

FOREIGN PATENT DOCUMENTS 0 534 057 A1 3/1993 (EP) .
WO 91/00145 1/1991 (WO) .

* cited by examiner

*Primary Examiner*—Fred Zitomer
(74) *Attorney, Agent, or Firm*—Flehr Hohbach Test Albritton & Herbert LLP; David J. Brezner

(57) ABSTRACT

Anion-exchange compositions are provided comprising anion-exchange functional groups comprising at least a first and a second nitrogen group, wherein the first nitrogen group is a quaternary amine and the second nitrogen group is selected from the group consisting of primary, secondary, tertiary or quaternary amines. Methods of making and using the compositions are also provided.

6 Claims, No Drawings

ANION-EXCHANGE RESINS INCLUDING ION-EXCHANGE GROUPS WITH AT LEAST TWO NITROGEN GROUPS, AND METHODS OF MAKING AND USING SAME

This is a division of application Ser. No. 08/609,642, filed Mar. 1, 1996 abandoned.

FIELD OF THE INVENTION

Anion-exchange compositions are provided comprising anion-exchange functional groups comprising at least a first and a second nitrogen group, wherein the first nitrogen group is a quaternary amine and the second nitrogen group is selected from the group consisting of primary, secondary, tertiary or quaternary amines. Methods of making and using the compositions are also provided.

BACKGROUND OF THE INVENTION

Carbohydrates such as glucose and mannose are ionizable to anions at high pH and can therefore be separated on anion exchange chromatography columns in sodium hydroxide eluents.

Known anion-exchange compositions generally fall into several categories. In the more traditional anion-exchange systems, synthetic support resin particles, generally carrying a negative charge, are covered with a layer of smaller synthetic resin particles carrying anion-exchange functional groups of positive charge, i.e. anion-exchange sites. The smaller particles are retained on the larger support particles via electrostatic attraction. The support resin can take a variety of forms. See for example U.S. Pat. Nos. 4,101,460; 4,383,047; 4,252,644; 4,351,909; and 4,101,460.

A more recent development utilizes an uncharged support resin and smaller latex particles containing anion-exchange functional groups, held together by a dispersant. See U.S. Pat. No. 5,324,752.

In addition, methods have been developed to eliminate the smaller latex particles altogether. For example, an anion exchange functionality is grafted, or covalently bonded, to a variety of polymeric substrates; see for example U.S. Pat. No. 5,006,784. Alternatively, the anion-exchange functional groups are not covalently attached but are tightly associated with the support resin particles, either electrostatically or otherwise; see U.S. Pat. No. 4,927,539.

Most carbohydrates, which are neutral under normal conditions and thus are not retained by anion exchange, can be retained and separated if the pH of the stationary phase is high enough. Eluent pH in the range of 12 to 14 is necessary to insure that carbohydrates are at least partially ionized, based on their dissociation constants. The pH of the stationary phase is a function of the concentration of hydroxide. Traditionally, the concentration of hydroxide in the stationary phase is adjusted by one of four methods, all of which have significant drawbacks:

1. Eluent composition: For carbohydrate chromatography, eluents-normally contain hydroxide. A hydroxide-only eluent system will provide the highest stationary phase pH possible. Addition of a secondary anion such as acetate to the eluent will result in a decrease in the stationary phase pH.
2. Crosslink of the stationary phase: Since crosslink controls the water content of the stationary phase by directly controlling the extent of swelling of the stationary phase in water, it also controls stationary phase pH when using a hydroxide-based eluent system. The lower the water content of the stationary phase, the lower the "dilution" of the stationary phase functional groups with water. This is turn results in an increase in the stationary phase pH. The limitation to this method of raising pH is that mass transport in the stationary phase is slowed by raising the crosslink much above the 5% level. This, therefore, represents an upper boundary to the stationary phase pH based on crosslink control. Further increases in crosslink will adversely effect chromatographic performance.
3. Size of functional group: The size of the functional group at the ion exchange site is to a modest extent capable of affecting the stationary phase pH when using a hydroxide-based eluent system. Changing the absolute size of the functional group allows minor adjustments in stationary phase pH by virtue of a diluent effect. As the size of the functional group is increased the total stationary phase volume is "diluted" by the larger volume occupied by the functional group. This approach has two problems. First, in order to have a significant effect on stationary phase pH, the mass of the functional group must be large in comparison to that of the monomer used to create the stationary phase. Under these conditions, there is generally a problem with stationary phase mass transport due to the steric effects of this large functional group. Second, this approach is only useful for reducing the stationary phase pH since the smallest possible functional group (i.e. the quaternary ion exchange site derived from the reaction of vinylbenzylchloride (VBC) and trimethylamine) is commonly used in the preparation of ion exchange sites. Thus the only option in this control mechanism is to increase the size of the functional group which has the effect of reducing the stationary phase pH.
4. Functional monomer fraction: Variation of the functional monomer fraction of the total stationary phase polymer mass can be used to control the stationary phase pH. For example an increase in the fraction of VBC in a latex particle will lead to a higher stationary phase pH when using a hydroxide-based eluent system. This, however, can only be accomplished by decreasing the fractional content of some other monomer in the latex. Typically the content of the latex is already 95% VBC and thus further increases in VBC content of the latex would have only a marginal impact on the stationary phase pH. Furthermore, the remainder of the monomer fraction in the typical latex particle used for high pH anion exchange chromatography of carbohydrates is the crosslinking monomer divinylbenzene (DVB). As mentioned above, lowering the crosslink level in the latex particle in order to allow an increase in the VBC content of the latex would actually have the opposite effect on the stationary phase pH. The increased swelling due to the lower DVB content would more than offset the minor increase due to the slightly higher monomer fraction of VBC. Thus, while variation of the functional monomer fraction may be a useful method of stationary phase pH control, current polymer formulations already provide the maximum stationary phase pH possible with this control mechanism.

Accordingly, it is an object of the present invention to provide compositions for use in ion exchange chromatography that can increase the effective stationary phase pH and thus improve the separation of a wide variety of carbohydrates.

It is a further object to provide methods for making such compositions, and for methods of using the compositions in the separation of carbohydrates.

SUMMARY OF THE INVENTION

In accordance with the objects outlined above, the present invention provides anion-exchange compositions comprising Component A comprising support resin particles and polymers containing anion-exchange functional groups. Each anion-exchange functional group comprises at least a first and a second nitrogen group. The first nitrogen group is a quaternary amine, and the second nitrogen group is selected from the group consisting of primary, secondary, tertiary or quaternary amines. The anion-exchange functional groups are retained directly or indirectly on Component A.

Also provided are anion-exchange compositions further comprising Component B comprising particles of synthetic resin comprising polymers containing anion-exchange functional groups on their available surfaces. Component A has negatively charged sites at least on the available surfaces which attract available sites of the particles of Component B.

Further provided are chromatographic analytical columns containing a packed bed of an anion-exchange chromatographic packing composition of the present invention.

Also provides are processes for chromatographic separation of carbohydrates, alditols and amino acids comprising passing a liquid solution comprising the carbohydrates through a bed comprising the anion-exchange compositions of the present invention.

Additionally provided are methods of producing an anion-exchange composition for use in anion-exchange chromatography comprising contacting functionalized monomers with a anion-exchange functional group under conditions that allow the attachment of the functional group to the monomers. The monomers containing anion-exchange functional groups are polymerized either before or after the anion-exchange functional groups are added to form polymers containing anion-exchange functional groups. The polymers containing anion-exchange functional groups are incorporated into an anion-exchange composition.

Further provided are compositions for the chromatographic separation of monosaccharides comprising Component A comprising support resin particles containing at least about 30% crosslinking monomeric units.

DETAILED DESCRIPTION OF THE INVENTION

The present invention provides a new more powerful method of raising stationary phase pH, which is particularly significant in the chromatographic separation of carbohydrates. The method involves the control of stationary phase pH by increasing the number of anion exchange sites that comprise each functional group. By attaching two or more anion exchange sites to the functional monomer it is possible to substantially increase the concentration of hydroxide in the stationary phase, and thus the stationary phase pH, when using a hydroxide-based eluent system such as used in the separation of carbohydrates.

In one embodiment, the present invention provides anion-exchange compositions comprising Component A, which are support resin particles, and polymers containing anion-exchange functional groups. Each anion-exchange functional group has at least two nitrogen groups. At least one of the nitrogen groups is a quaternary amine, and the other nitrogen groups are either primary, secondary, tertiary or quaternary amines. These functional groups are retained either directly or indirectly on Component A.

By the term "Component A" herein is meant insoluble synthetic support resin particles, such as are known in the art. Component A is traditionally referred to in the art as the "substrate". A wide variety of suitable Component A materials are known in the art, including, but not limited to, poly(phenol-formaldehyde), polyacrylic, or polymethacrylic acid or nitrile, amine-epichlorohydrin copolymers, graft polymers of styrene on polyethylene or polypropylene, poly(2-chloromethyl-1,3-butadiene), poly(vinylaromatic) resins such as those derived from styrene, alpha-methylstyrene, chlorostyrene, chloromethylstyrene, vinyltoluene, vinylnaphthalene or vinylpyridine, corresponding esters of methacrylic acid, styrene, vinyltoluene, vinylnaphthalene, and similar unsaturated monomers, monovinylidene monomers including the monovinylidine ring-containing nitrogen heterocyclic compounds, and copolymers of the above monomers. In addition, the resin particles of Component A may be macroporous, such as those produced from suspension polymerization techniques (see U.S. Pat. No. 5,324,752, and references cited therein), and may be formed of any of the materials recited in that patent and such references.

In a preferred embodiment, the substrate polymer is chosen to maximize the oxygen retention of the column. Oxygen retention is important since the detection of carbohydrates is generally done by pulsed amperometric detection on gold electrodes as described by S. Hughes and D. C. Johnson, Anal. Chim. Acta. 132, 11–12 (1981). Pulsed amperometric detection of carbohydrates occurs on a gold oxide layer that is formed on the electrode during use. Briefly, in a pulsed waveform, three potentials are applied to the electrode within about 1 second. These potentials are each applied for a portion of the second. The first potential, E1, is the voltage at which the current is collected for detection. The second potential is higher and is used to clean the electrode of residual species by more fully oxidizing them. The third potential, E3, which is more negative, allows adsorption of species for detection at E1. This detection scheme produces a current of electrons from the oxidation of the carbohydrates. When dissolved oxygen from the eluent and/or sample pass over the electrode, a decrease in current is observed. This decrease can be observed as a dip in the chromatographic baseline when a column that retains oxygen is used to separate the carbohydrates. If the oxygen elutes near or with any of the carbohydrates, quantitation of the carbohydrates is compromised because current from the carbohydrate is effectively diminished by the oxygen. Since anion exchange columns that separate carbohydrates, such as the CarboPac PA1 also retain oxygen in the same time frame, oxygen interference has been a problem.

In the past, efforts to minimize this quantitation problem have centered around optimizing the potentials in the pulse sequence of the detector in order to minimize the magnitude of the oxygen signal while still detecting the carbohydrates at a useable signal-to-noise ratio. This is done by choosing potentials where the adsorption of oxygen is minimized relative to the carbohydrates. Although this approach improved quantitation, the problem was never completely resolved.

Retention of oxygen occurs in the Component A portion of the column packing, as opposed to the latex. We discovered that the retention volume for oxygen is effected by the divinylbenzene content of the resin as well as the degree of sulfonation.

Accordingly, in a preferred embodiment, the support resin particles comprise beads of cross-linked polymer or copolymer, such as styrene-ethylvinylbenzene-divinylbenzene copolymer, containing between about 30% to about 100% divinylbenzene monomer by weight. Preferably, the support resin has at least 30%, more preferably about 40%, and most preferably at least about 55% divinylbenzene content.

Preferred support resin particles comprise styrene-ethylvinylbenzene-divinylbenzene copolymer with 55% divinylbenzene. Other preferred support resins include other styrenic co-polymers and terpolymers containing divinylbenzene such as styrene-ethylvinylbenzene-divinylbenzene and vinyltoluene-ethylvinylbenzene-divinylbenzene.

The size of the Component A support resin particles will vary depending on the other components of the system. Generally, the Component A particles are from about >2500 to about 140 mesh (about 3 to about 105 microns), with from about 5 to about 25 being preferred, and from about 8 to about 13 being particularly preferred. The Component A particles may be monodisperse, and may also be macroporous. Component A particles are well known in the art, see for example, U.S. Pat. Nos. 4,101,460; 4,383,047; 4,252,644; 4,351,909; 4,101,460; and 5,324,752, hereby incorporated by reference.

In a preferred embodiment, for example when Component B particles are present, or when the polymers containing the anion-exchange functional groups are retained directly on the support resin particles, the Component A support resin particles have negatively charged sites on at least the available surfaces of the particles. These negatively charged sites (also referred to as "cation-exchange sites") are generally sulfonate functional groups, although as is appreciated in the art, may be carboxyl functional groups or chelating sites such as amino carboxylic acid groups, which are attracted to or form coordination complexes with the anion-exchange functional groups. The degree of sulfonation is chosen to provide the minimum required to achieve acceptable retention of the oppositely-charged anion-exchange functional groups without increasing the level of sulfonation to a point at which oxygen retention is significant. An acceptable level of retention of the oppositely-charged anion-exchange functional groups is defined as the ion exchange capacity that is necessary to retain and separate the analytes of interest, such as carbohydrates. Capacity for the analytes vs. oxygen are carefully balanced so that the carbohydrates are well separated but oxygen still elutes after the last carbohydrate. The sulfonation level is characterized by cation exchange capacity. The cation exchange capacity of the resin is generally from about 0.05 to about 5 millequivalents per gram, with about 0.20 to about 3.0 being preferred, and from about 0.8 to about 1.9 being most preferred. General methods for sulfonation are well known in the art, see for example, U.S. Pat. Nos. 4,101,460; 4,383,047; 4,252,644; 4,351,909; 4,101,460; and 5,324,752, hereby incorporated by reference.

The term "available surface" as used herein means that surface of the resin which will come into contact either with other resin particles or the eluent. Thus, for example, the available surface of Component A is that surface which will come into contact with either particles of Component B, when present, or with the eluent containing the analytes to be separated, for example, the carbohydrates. When Component A is made from beads of a gel type resin, the available surface are will be essentially the outer surface of those beads, including the surface of the macropores which may be optionally present. Similarly, the available surface of Component B is that surface which will come into contact with either Component A, when present, or the eluent.

By "anion-exchange functional groups" herein is meant that part of the anion-exchange composition that has a net positive charge and serves as the anion exchanging sites of the composition. Traditional anion-exchange resins utilize a single nitrogen group, i.e. a quaternary amine derived from such tertiary amines as -trimethylamine or -dimethylethylamine, as the anion-exchange functional group. The anion-exchange functional groups of the present invention have at least a first and a second nitrogen group.

At least one of the nitrogen groups, i.e. the first nitrogen group, is a positively-charged quaternary amine. The additional nitrogen group(s) are selected from the group consisting of primary, secondary, tertiary or quaternary amine groups.

In a preferred embodiment, the anion-exchange functional groups comprise from two to 10 nitrogen groups, with from 2 to 6 being preferred, and two and three nitrogen groups being particularly preferred.

By "nitrogen group" herein is meant either a primary (X-NH$_2$), secondary (X-NHR), tertiary (X-NRR') or a quaternary amine (X-NRR'R"+) group, wherein R, R' and R" are straight or branched chain alkyl group from about 1 to 10 carbons, with from 2 to 5 being preferred and 2 to 3 being particularly preferred. As outlined below, in the case of tertiary or quaternary amines, two of the R groups together can form a cycloalkyl group, or two of the R groups together with X, form a cycloalkylamine moiety. The X represents the remainder of the anion-exchange functional group, comprising at least one additional nitrogen group and an alkyl linker.

In a preferred embodiment, the two nitrogen groups are separated by an alkyl "linker" group. The alkyl linker comprises a straight or branched chain alkyl group from about 1 to about 10 carbon atoms, preferably from about 2 to 5 carbon atoms, with from about 2 to 3 being particularly preferred. In a preferred embodiment the linker is at least a two carbon chain alkyl group such that the second nitrogen group is capable of forming a quaternary amine under the appropriate conditions (for example, treatment with alkylating agents such as methyliodide or dimethyl sulfate).

In one embodiment, the anion-exchange functional group may comprise a long alkyl chain, with nitrogen groups spaced along the chain. For example, the anion-exchange functional group may comprise a carbon chain with primary amines on alternating carbon atoms, which can then be functionalized to quaternary amines. The alkyl chain in this embodiment may be quite long.

As will be appreciated by those in the art, the anion-exchange functional group can contain alcohol moieties or ether linkages. For example, ethanolamine derivatives may be used. Similarly, groups such as NRR'R"+—CH$_2$CH$_2$—O—CH$_2$CH$_2$—NRR'R"+ may be used. In general, atoms other than carbon atoms should not be attached immediately to the nitrogen atoms of the nitrogen groups. Preferably there is at least one carbon atom in between the nitrogen atom of the nitrogen group and the heteroatom, with two carbon atoms being preferred.

In a preferred embodiment, when the nitrogen group is a tertiary or quaternary amine, two R groups (for example R and R') may form a cycloalkyl group. That is, the nitrogen atom of the nitrogen group and the R and R' group forms a cycloalkylamine, for example pyrrolidine, piperidine or piperazine.

In a preferred embodiment, two or more of the nitrogen groups of the anion-exchange functional group form a cycloalkylamine group. For example, in a preferred embodiment, two nitrogen groups form a triethylenediamine group (1,4-diazabicyclo[2,2,2]octane). Upon addition to a functional monomer such as vinylbenzylchloride (VBC), one of the nitrogen groups of the triethylenediamine becomes a quaternary amine, and the other is a tertiary amine, that can easily be quaternized if desired, using alkylating agents such as methyliodide and dimethyl sulfate as is known in the art. In a preferred embodiment, two of the nitrogen groups form piperazine.

In a preferred embodiment, as is more fully explained below, the anion-exchange functional group is chosen to minimize the extent of crosslinking between two functionalized monomers. Thus, with triethylenediamine, the extent of crosslinking is minimized.

In a preferred embodiment, all of the nitrogen groups of the anion-exchange functional group are quaternary amines. Thus, for example, in a preferred embodiment triethylenediamine is the functional group precursor containing the two nitrogen groups, which after attachment to VBC and treatment with methyliodide renders two quaternary amines per anion-exchange functional group. Similarly, when the anion-exchange functional group comprises three or more nitrogen groups, in a preferred embodiment, all of the nitrogen groups are quaternary, requiring separation of the nitrogen groups by at least two carbon atom alkyl chains.

In a further embodiment, at least one of the multiple nitrogen groups is a primary, secondary or tertiary amine, with tertiary being preferred. For example, the weak basicity of a half-quaternized difunctional anion-exchanger, such as when the nitrogen groups comprise triethylenediamine and only one of the nitrogens is quaternized, can provide a better separation gap being amino sugars and monosaccharides as is discussed below.

It should be understood that neither enamine groups (—C=N—), amidine groups (structure 1), nor guanidine groups (structure 2) are nitrogen groups are herein defined. Arrangement where a nitrogen atom is connected to the carbon atom with double bond imparts completely different properties to such a group. In particular such groups tend to have lower chemical stability as well as tend to ionize (to form protonated nitrogen site for example) with much greater difficulty as compared to amines that contain only single bonds between nitrogen and carbon atoms. Thus, for example, amidine groups have poor chemical stability in the free base form. If enamine, amidine or guanidine groups are present, the anion-exchange functional group must contain at least two additional nitrogen groups as herein defined.

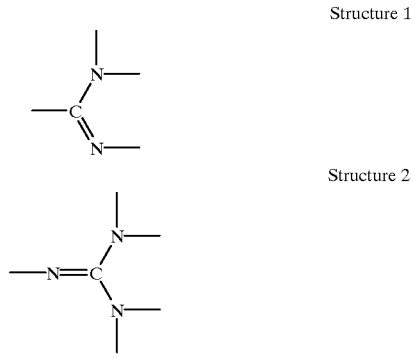

Structure 1

Structure 2

The anion-exchange functional groups are attached to functionalized monomers, and incorporated into polymers, and it is the polymers containing the anion-exchange functional groups which are associated with the synthetic resins as outlined below. Thus, the anion-exchange functional groups with two or more nitrogen groups are attached to the monomeric subunits of the polymer just as is known in the art for anion-exchange sites that contain single quaternary amines. In a preferred embodiment, at least about 50% of the monomeric subunits of the polymers have anion-exchange functional groups attached. In a preferred embodiment, greater than about 75% is preferred, with greater than about 92–95% being particularly preferred.

Generally, when the polymers containing the anion-exchange functional groups are directly retained on Component A, the polymers average about 20 monomeric units in length, with from about 5 to about 40 being preferred, and from about 15 to about 25 being particularly preferred.

"Functionalized monomers" are known polymerizable monomers containing at least one a functional group that allows attachment of anion-exchange functional groups. Suitable functionalized monomers will depend on the polymers used to make the anion-exchange compositions of the invention, and include, but are not limited to, the commercially available monomers such as vinylbenzylchloride (VBC), vinylbenzylbromide, vinylbenzyliodide, glycidylacrylate, and glycidylmethacrylate, as well as functionalized monomers not currently commercially available such as vinylbenzyl glycidyl ether, Ω-haloalkylacrylates, methacrylates, or acrylamides or methacrylamides.

As outlined below, the anion-exchange functional group is attached to the monomer at any point. That is, when VBC is used as the monomer for attachment of the anion-exchange functional group, for example, it can be either one of the nitrogen atoms of any nitrogen group which is attached to the monomer during chloride replacement, a carbon atom of the anion-exchange functional group, or an alcohol group, for example. In a preferred embodiment, the anion-exchange functional group is attached to the monomer via a nitrogen atom of a tertiary nitrogen group, forming a quaternary amine.

By "retained directly on Component A" or grammatical equivalents herein is meant that the polymers containing the anion-exchange functional groups are irreversibly retained on the support resin particles. Thus, for example, polymers containing the anion-exchange functional groups are grafted, or covalently attached to the support resin particles directly, i.e. without an intervening medium, as is generally described in U.S. Pat. No. 5,066,784. Similarly, polymers containing anion-exchange functional groups can form a coating on the particles of support resin via non-covalent attachment. This attachment, although non-covalent, is considered irreversible. "Irreversible" in this context means that a substantial number of the polymers containing the anion-exchange functional groups will not be displaced from the available surface of the resin under the normal chromatographic conditions, for example by solutions of strong electrolytes or polyelectrolytes. Nor will shearing forces such as those encountered when a liquid is passed through an anion-exchange column under normal conditions displace the polymers.

In a preferred embodiment, this coating is retained on the available surface of the support resin particles of Component A via electrostatic forces such as is generally described in U.S. Pat. No. 4,927,539, hereby incorporated by reference. In this embodiment, Component A has negatively charged sites on at least the available surfaces of the particles which attract the polymers containing the anion-exchange functional groups, and thus the polymers containing the anion-exchange functional groups are directly retained.

In additional embodiments, this coating is irreversibly attached via other types of forces, such as hydrogen bonding or local hydrophobic interactions.

By "indirectly retained on Component A" or grammatical equivalents herein is meant that the polymers containing the anion-exchange functional groups is separated from Component A by a second, intervening medium, and may be attached to the medium, which in turn is retained directly on Component A, as is known in the art. See for example, U.S.

Pat. Nos. 4,101,460; 4,383,047; 4,252,644; 4,351,909; 4,101,460; and 5,324,752, hereby incorporated by reference.

Thus, in a preferred embodiment, the anion-exchange compositions of the invention further comprise Component B, which are particles of synthetic resin having anion-exchange sites on their available surfaces. Component B, frequently referred to in the art as the "latex", "layering particles", or "monolayer", comprises cross-linked polymers that have functionalized monomers, as defined above, as a component. The Component B particles may be formed of any well known synthetic resin such as is described above for Component A particles, with cross-linked polymers of poly(vinylaromatic) resins, such as the copolymers styrene-divinylbenzene copolymer, divinylbenzene-vinylbenzylchloride copolymer, or methacrylatevinylbenzylchloride copolymer. The Component B particles are usually derived from a latex emulsion. Component B materials and methods are well known in the art, see for example, U.S. Pat. Nos. 4,101,460; 4,383,047; 4,252,644; 4,351,909; 4,101,460; and 5,324,752, hereby incorporated by reference.

The size ratio of Component A to Component B can vary, and is generally well known in the art. As noted above, the Component A particles usually range from about 3 to about 50 microns, with the Component B particles ranging from about 20 to about 600 nanometer, with from about 100 to about 500 being preferred, and from about 300 to about 450 being particularly preferred.

The Component B resin will contain some fraction of functionalized monomeric units in order to attach the anion-exchange functional groups. Generally, the Component B resin will have at least about 50% functionalized monomer, more preferably at least about 75% functionalized monomer, and most preferably at least about 90 to 95% functionalized monomer, with about 99% being particularly preferred. In a preferred embodiment, the Component B resin contains from about 1 to about 50% crosslinking monomer, such as divinylbenzene, with from about 1 to about 10% being preferred and from about 1 to about 5% being preferred. In the absence of crosslinking monomer, the resulting polymer may swell excessively and cause a loss of the charge density that is important in the present invention. In an additional embodiment, the Component B resin may be copolymerized with hydrophobic monomers such as styrene or hydrophilic monomers such as vinylbenzylalcohol.

The polymers containing the functionalized monomers form the resin particles, which are then reacted with the anion-exchange functional groups to form polymers containing anion-exchange functional groups. Alternatively, as outlined below, the anion-exchange functional groups are added to the functionalized monomers prior to polymerization into the Component B resin particles.

This results in Component B resin particles that comprise polymers containing or including anion-exchange functional groups, at least on their available surfaces. Generally, as outlined above, at least about 50% of the monomeric subunits of Component B resin particles contain anion-exchange functional groups, with at least about 90% being preferred.

The polymers of the present invention are distinguishable over polymers made using ethylenediamine as the crosslinker, such as described in U.S. Pat. No. 4,101,460. These prior art polymers used 1% ethylenediamine as the crosslinker. This does not result in any significant amount of quaternary amines, as it is unlikely that three separate vinylbenzylchloride monomers would attack a single nitrogen atom to form a quaternary ammonium site. Even if present, the number of quaternary amines generated in this reaction would not result in a significant increase in the stationary phase pH under the conditions outlined herein.

In a preferred embodiment, the Component B resin particles are retained on the Component A particles by electrostatic forces. In this embodiment, the Component A support resin particles have negatively charged sites on at least their available surfaces. The Component B particles comprise polymers containing anion-exchange functional groups on their available surfaces which are attracted to the available negatively charged sites on Component A, and thus the two Components are held together via the electrostatic interaction. This interaction is considered irreversible under normal chromatographic conditions.

In another embodiment, the Component B resin particles are retained on the Component A particles via the use of a dispersant, such as described in U.S. Pat. No. 5,324,752, hereby incorporated by reference. In this embodiment, the Component A particles need not have negatively charged sites on their available surfaces. Rather, the Component A particles are formed by suspension polymerization in the presence of a suitable dispersant, causing the formation of support resin particles having dispersant irreversibly attached. The support resin particle-dispersant complex is then contacted with the Component B particles comprising polymers containing anion-exchange functional groups. Under suitable reaction conditions, the Component B particles become irreversibly attached, to form a Component A particle-dispersant-Component B particle complex.

The anion-exchange compositions of the present invention have an increased capacity and better separation of monosaccharides, alditols and amino acids as compared to traditional single nitrogen group compositions. In general, anion-exchange compositions with anion-exchange functional groups containing two nitrogen groups will have at least about a 50% increased capacity over a single-nitrogen group composition, with about 60 to 75% possible as well. For example, latex containing additional nitrogen groups will swell more than the corresponding single nitrogen containing latex due due to the increased hydration of the polymer, and thus will not have a 100% increase in capacity.

In addition, the anion-exchange compositions of the invention exhibit improved separation of monosaccharides, alditols and amino acids as compared to known resins. For example, known resins and methods do not allow the separation of two important sugar alcohols, sorbitol and dulcitol, due to the fact that the stationary phase pH is not high enough to ionize either sorbitol or dulcitol to any significant extent. In comparison, as outlined in the examples, the anion-exchange resins of the present invention allow the separation of dulcitol and sorbitol with a valley to peak ratio of at least about 0.25, with valley to peak ratios of at least about 0.50, 0.60, and 0.70 also possible.

The anion-exchange compositions of the invention may be made as follows. Component A support resin particles are made as is known in the art, using general polymerization techniques. See U.S. Pat. Nos. 4,101,460; 4,383,047; 4,252, 644; 4,351,909; 4,101,460 and 5,324,752, hereby incorporated by reference.

The monomers containing anion-exchange functional groups are made from functionalized monomers as depicted below in Reactions 1 to 6, using VBC as the exemplary functionalized monomer.

Reaction 1

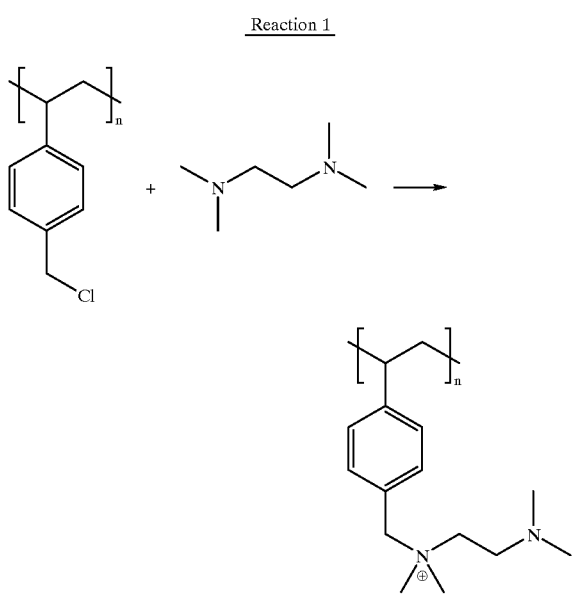

Reaction 2

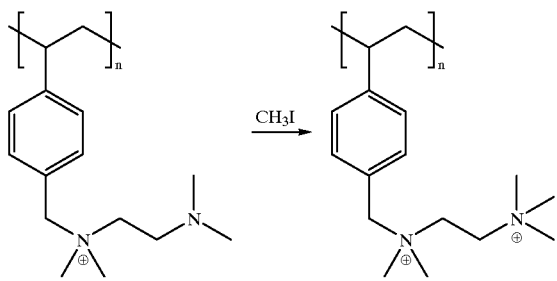

Reactions 1 and 2 use tetramethylethylenediamine as the two nitrogen groups plus the alkyl linker. However, in the absence of further manipulation, the undesirable crosslinking reaction occurs, depicted in Reaction 3:

Reaction 3

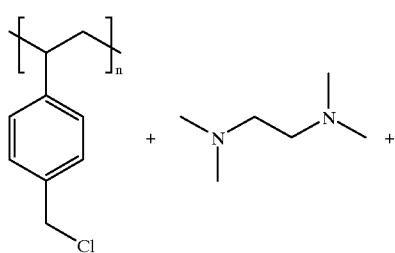

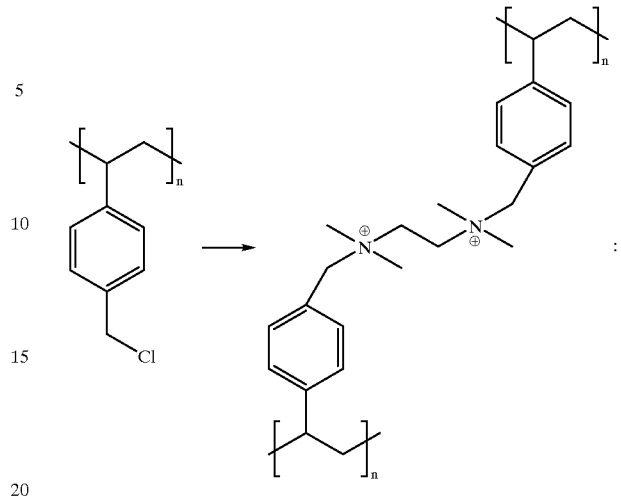

Reaction 3 is not preferred for two reasons; it fails to result in more than one anion-exchange site per monomer unit, and more importantly, the crosslinking of the stationary phase is increased. As outlined above, elevation of crosslink can only be used to a limited extent without adversely effecting the mass transport kinetics of the stationary phase. Reaction 3 tends to proceed at such a rate that an unacceptable amount of crosslink is created, although in some embodiments this may be preferred.

This problem can be avoided by the use of blocking or protecting groups during synthesis as is depicted in Reactions 4–7. These reactions use the formyl protecting group to prevent crosslinking, although other protecting groups can be used. See generally, Greene et al., Protective Groups in Organic Synthesis, 2d Ed., Wiley & Sons, 1991.

Reaction 4

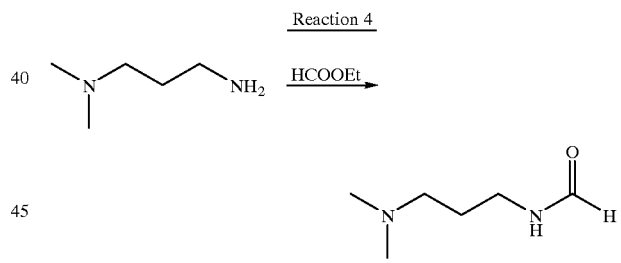

Reaction 5

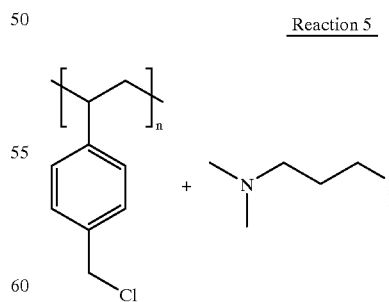

Reactions 8–11 illustrate the use of protecting groups with a tri-functional anion-exchange functional group:
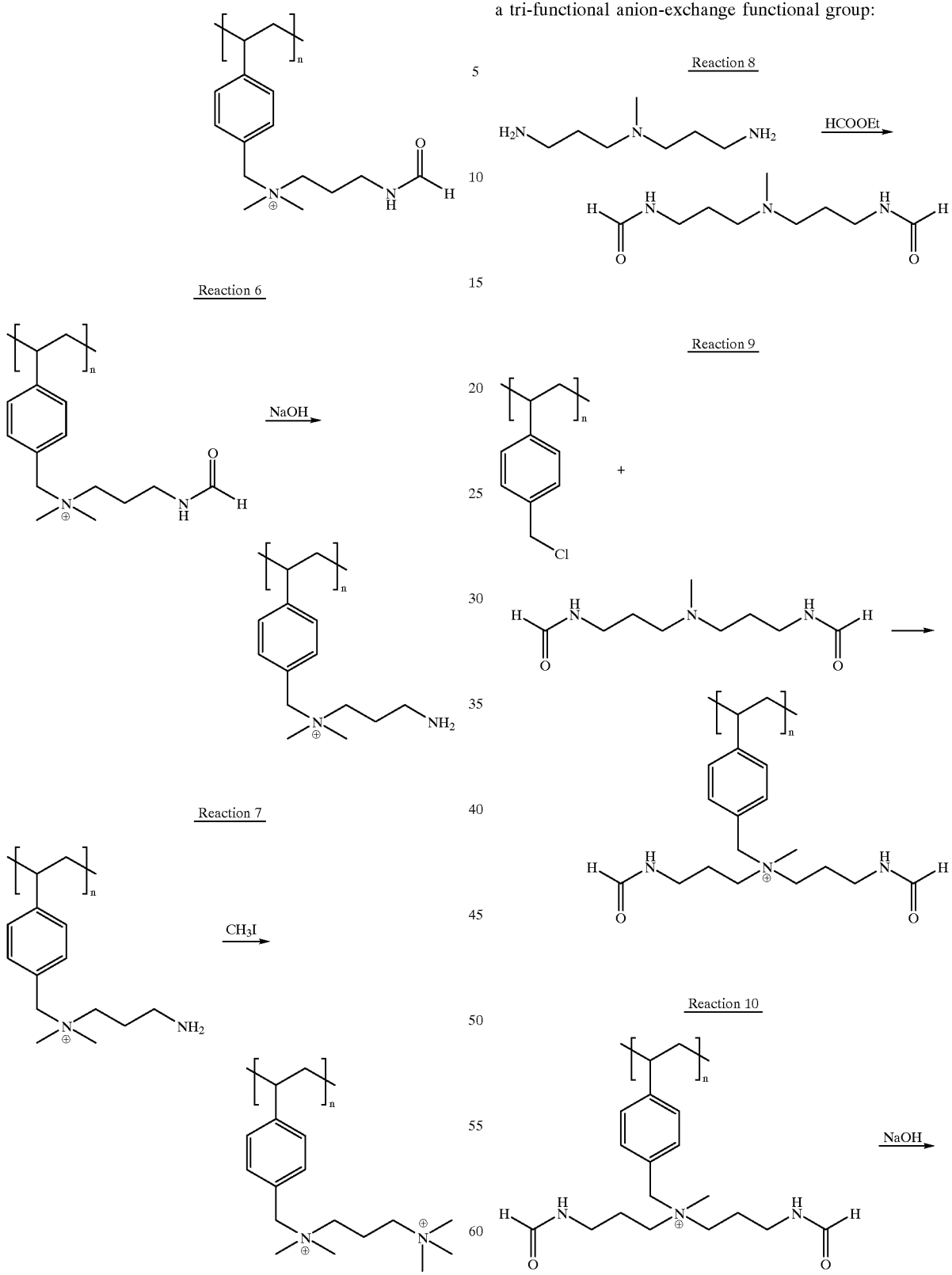

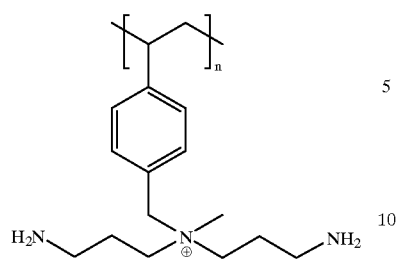

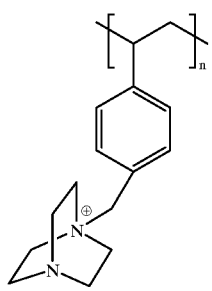

Reaction 11

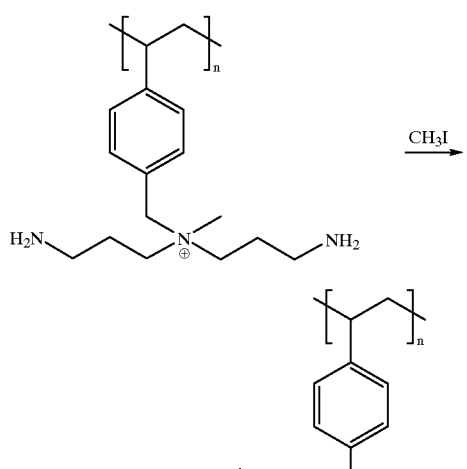

In a preferred embodiment, the anion-exchange functional group is triethylenediamine, as depicted in Reactions 12 and 13. The product of Reaction 13 is particularly beneficial in that it creates the smallest possible difunctional anion-exchange site and the highest possible stationary phase pH.

The triethylenediamine embodiment has a distinct advantage in that virtually no crosslinking occurs (Reaction 14).

Reaction 12

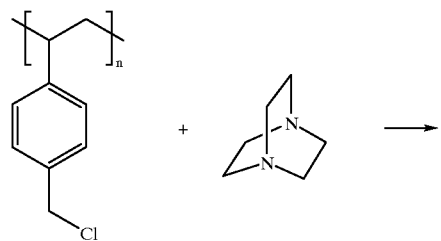

Reaction 13

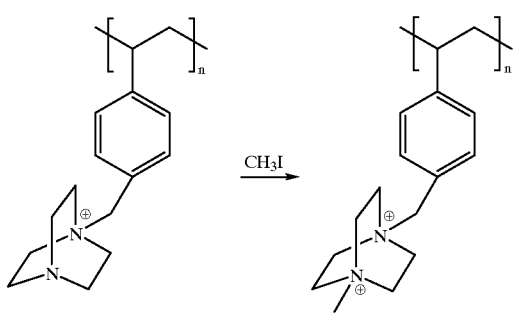

Reaction 14

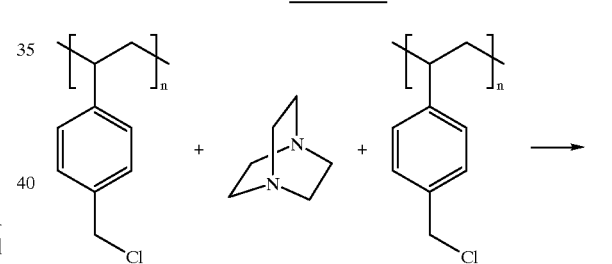

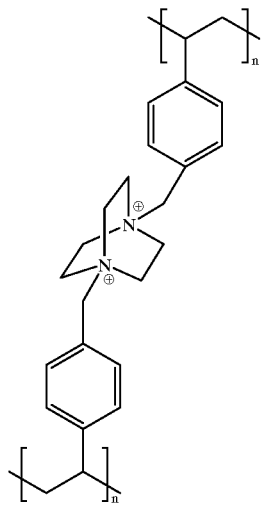

Direct retention of polymers containing the anion-exchange functional groups on Component A may be accomplished in several ways. In one embodiment polymers containing functionalized monomers are grafted onto the Component A particles as previously described. Once attached to the Component A particles, the functionalized monomers may be reacted with the anion-exchange functional groups. Alternatively, the anion-exchange functional groups may be added to the functionalized monomers prior to polymerization. After polymerization, the polymers containing the anion-exchange functional groups are grafted to the Component A particles using known chemistries.

When the polymers containing the anion-exchange functional groups are not covalently attached but rather form a coating on the Component A particles, the anion-exchange composition is made via the addition of polymers containing the anion-exchange functional groups. That is, functionalized monomers are polymerized and then the polymer is reacted with the anion-exchange functional groups. The polymer is then associated with the Component A particles either electrostatically or otherwise.

Adding the anion-exchange functional groups to the Component B particles is accomplished in a similar manner, and can done in several ways. In one embodiment, a batch of latex is synthesized in the conventional manner using a functionalized monomer as a component, see U.S. Pat. Nos. 4,101,460; 4,383,047; 4,252,644; 4,351,909; 4,101,460 and 5,324,752, hereby incorporated by reference. The latex can then be combined with the anion-exchange functional group, either protected or not, to form Component B particles comprising polymers containing the anion-exchange functional groups. The Component B particles are then agglomerated onto the Component A particles, deprotected if required and then reacted with a suitable alkylating agent such as methyliodide or dimethyl sulfate.

Alternatively, functionalized monomers can be reacted with the anion-exchange functional groups, either protected or not, and then mixed with other suitable monomers and polymerized into polymers containing the anion-exchange functional groups. The polymers can then be deprotected, if necessary, and reacted with a suitable alkylating agent.

Once made, the anion-exchange compositions may be packed into chromatographic columns.

Once made, the anion-exchange compositions of the invention find use in a number of applications.

In the broadest embodiment, the anion-exchange compositions can be used to replace current anion-exchange compositions in any anion-exchange chromatographic procedure.

In a preferred embodiment, the anion-exchange compositions are used in chromatographic columns for the separation of carbohydrates.

In a preferred embodiment, the anion-exchange compositions of the invention are used to separate sugar alcohols. Sugar alcohols are very weak acids when compared to common carbohydrates. As a result they tend to be poorly retained and exhibit poor selectivity on conventional anion-exchange phases. Separation of two important sugar alcohols, sorbitol and dulcitol is not possible on either of the latex based separators designed for separation of carbohydrates (the CarboPac PA1 and the CarboPac PA100, made by Dionex; both use mono-quaternary ammonium functionalities on latexes) due to the fact that the stationary phase pH is not high enough to ionize either sorbitol or dulcitol to any significant extent. Accordingly, the only previously known viable method of separating these sugar alcohols was to use the CarboPac MA1 column (Dionex). The packing in the CarboPac MA1 packing is a fully functionalized, macroporous, anion-exchange resin with 15 times the column capacity of the CarboPac PA1 column. The resin has 3 times the crosslink of the latex of the CarboPac PA1 and PA100 columns. The higher capacity allows the use of a more concentrated eluent (0.5 M NaOH versus 0.15 M NaOH for the CarboPac P columns) which in turn results in greater ionization of sugar alcohols in the mobile phase. The higher crosslink of the CarboPac MA1 column raises the stationary phase pH which results in an increase in the extent of ionization of sugar alcohols in the stationary phase. The combination of these two factors does allow the separation of the sugar alcohols but the price for this capacity is the poor column stability, slow separations, and major production difficulties of the CarboPac MA1.

However, the ability to raise the stationary phase pH above the levels previously achievable, without increasing the capacity or crosslink of the resin, allows the separation of sugar alcohols such as sorbitol and dulcitol on the traditional latex based stationary phases, with the incumbent advantages of speed, ruggedness and easy production.

In a further embodiment, the anion-exchange compositions are used to generate chromatographic columns and systems with superior lysine-monosaccharide selectivity. Conventional latex based anion-exchangers such as the CarboPac PA1 or the CarboPac PA100 columns have problems separating lysine and monosaccharides which adversely effects the quantitation of several of the monosaccharides. The anion-exchange compositions of the present invention allow extended retention of lysine to move the lysine peak away from the monosaccharide peaks, thus eliminating a major problem with conventional latex based anion-exchangers.

In an additional preferred embodiment, the anion-exchange compositions are used to separate monovalent and divalent ions. By using di-, tri- or polyfunctional anion-exchange functional groups, it is possible to achieve substantially higher separation factors for monovalent ions from divalent ions as a class. Thus, the compositions find particular use when trying to determine traces of divalent ions in the presence of a large excess of a predominantly monovalent ion or, alternatively, when trying to determine traces of monovalent ions in the presence of a large excess of a predominantly divalent ion.

Additionally, the anion-exchange compositions of the invention when in a half- or partially quaternized form (i.e. at least one nitrogen of the anion-exchange functional group is not a quaternary amine) are used to provide superior monosaccharide selectivity. The general problem with monofunctional anion-exchangers is that the eluent conditions which provide optimal separation of galactose, glucose, and mannose result in marginal separation of glucosamine and galactose. The higher basicity of the partially quaternized di- or polyfunctional anion-exchange functional group provides a better separation gap between the amino sugars (galactosamine and glucosamine) and the monosaccharides (galactose, glucose and mannose).

The following examples serve to more fully describe the manner of using the above-described invention, as well as to set forth the best modes contemplated for carrying out various aspects of the invention. It is understood that these examples in no way serve to limit the true scope of this invention, but rather are presented for illustrative purposes. All references cited herein are incorporated by reference.

EXAMPLES

Example 1

Synthesis of a Standard Latex for Carbohydrate Separations

An aqueous phase is prepared by mixing 200 g water, 1 g surfactant, 1 g of 1% sodium bicarbonate, 1 g $K_2S_2O_8$ and 0.6 g $K_2S_2O_5$. An organic phase is prepared by mixing 3 g of 55% divinylbenzene and 47 g vinylbenzylchloride. The phases are combined under a nitrogen blanket fo 20 min. The reaction vessel is transferred to a processor where it is rotated at 6 rpm at 32 deg C. for 18 hrs. This process yielded a raw latex that is about 205 nm in diameter.

Example 2

Eleven grams of latex from Example 1 is functionalized by reaction with 10 grams of 1 Molar triethylenedianime via continuous addition for 18 hrs. This process yielded a latex wit a diameter of about 420 nm and a polydispersity of 0.04. This latex bears one quaternary nitrogen and one teriary nitrogen per unit.

Example 3

The latex from Example 2 is diquaternized with 1% methyliodide in acetonitrile for 6 hours at 85 deg C. This latex bears 2 quaternary nitrogens per unit.

Example 4

A 10 um resin that is 55% divinylbenzene is sulfonated with sulfuric acid at 50 deg C. for 3 hours. The ion exchange capacity of this resin is 1.7 mEq/g.

Example 5

A 10 um resin that is 2% divinylbenzene is sulfonated with sulfuric acid at 50 deg C. for 3 hours. This resin has an ion exchange capacity of about 1.2 mEq/g.

Example 6

The latex from Example 2 is agglomerated onto the resin from Example 4 and packed into a 4×250 mm column. Using an eluent of 0.018M sodium hydroxide, oxygen elutes at 17 minutes and mannose elutes at about 14 minutes. With this same eluent, dulcitol and sorbitol are separated with a valley to peak height ratio of 0.27.

Example 8

The latex from Example 3 is agglomerated onto the resin from Example 4 and packed into a 4×250 mm column. Using a 0.018M sodium hydroxide eluent, dulcitol and sorbitol are separated with a valley to peak height ratio of 0.67.

We claim:

1. A chromatographic analytical column, the column containing a packed bed of an anion-exchange chromatographic packing and capable of quantitative chromatographic separation of carbohydrates, which column comprises:
    a) Component A comprising support resin particles; and
    b) polymers including polymerized functionalized monomers each containing anion-exchange functional groups, each anion-exchange functional group comprising at least a first and second nitrogen group, wherein said first nitrogen group is a quaternary amine of the formula X-NRR'R" and said second nitrogen group is selected from the group consisting of a primary amine of the formula X-NH$_2$, a secondary amine of the formula X-NHR, a tertiary amine of the formula X-NRR' or a quaternary amine of the formula X-NRR'R" wherein R, R' and R" are straight or branched chained alkyl groups or cycloalkyl groups having from 1–10 carbons, and said polymers containing said anion-exchange functional groups are retained directly or indirectly on Component A.

2. A chromatographic analytical column, the column containing a packed bed of an anion-exchange chromatographic packing capable of quantitative chromatographic separation of carbohydrates, which column comprises:
    a) Component A comprising support resin particles; and
    b) polymers containing anion-exchange functional groups, each anion-exchange functional group comprising at least a first and a second nitrogen group, wherein said first nitrogen group is a quaternary amine, and said second nitrogen group is selected from the group consisting of primary, secondary, tertiary or quaternary amines wherein said polymers are not substantially crosslinked through said anion functional groups;
wherein said polymers containing said anion-exchange functional groups are retained directly or indirectly on Component A.

3. A chromatographic analytical column, the column containing a packed bed of an anion-exchange chromatographic packing capable of quantitative chromatographic separation of carbohydrates, which column comprises:
    a) Component A comprising support resin particles; and
    b) polymers containing anion-exchange functional groups, each anion-exchange functional group comprising at least a first and a second nitrogen group, wherein said first nitrogen group is a quaternary amine, and said second nitrogen group is a tertiary amine;
wherein said polymers containing said anion-exchange functional groups are retained directly or indirectly on Component A.

4. The chromatographic analytical column of claim 1 in which said support resin particles contain at least about 30% crosslinking monomeric units.

5. The chromatographic analytical column of claim 1 where said support resin particles contain at least about 55% crosslinking monomeric units.

6. The chromatographic analytical column of claim 4 wherein said crosslinking monomeric units are divinylbenzene.

* * * * *